(12) United States Patent
Robinson et al.

(10) Patent No.: US 6,869,540 B2
(45) Date of Patent: Mar. 22, 2005

(54) BALLAST WATER OZONE INJECTION METHOD AND SYSTEM

(75) Inventors: Jack H. Robinson, Fairfax County, VA (US); Michael D. Jennings, Ellicott City, MD (US); Richard A. Mueller, Olmsted Falls, OH (US)

(73) Assignee: Nutech 03, Arlington, VA (US)

( * ) Notice: Subject to any disclaimer, the term of this patent is extended or adjusted under 35 U.S.C. 154(b) by 19 days.

(21) Appl. No.: 10/402,298

(22) Filed: Mar. 31, 2003

(65) Prior Publication Data

US 2003/0196967 A1 Oct. 23, 2003

Related U.S. Application Data

(60) Provisional application No. 60/372,806, filed on Apr. 17, 2002.

(51) Int. Cl.$^7$ .............................. C02F 1/78; B63B 39/03
(52) U.S. Cl. .................... 210/760; 210/764; 210/242.1; 114/125
(58) Field of Search ................................ 210/760, 764, 210/192, 199, 205, 242.1; 422/28, 186.07; 114/74 R, 125

(56) References Cited

U.S. PATENT DOCUMENTS

| | | | |
|---|---|---|---|
| 3,937,662 A | | 2/1976 | Bartik |
| 4,314,519 A | * | 2/1982 | Yunoki et al. ............... 114/125 |
| 4,317,333 A | | 3/1982 | Webby |
| 4,364,516 A | | 12/1982 | Rhoades et al. |
| 4,619,763 A | | 10/1986 | O'Brien |
| 5,040,487 A | * | 8/1991 | Bollyky et al. ............. 119/234 |
| 5,218,988 A | | 6/1993 | McNamara et al. |
| 5,494,576 A | | 2/1996 | Hoppe et al. |
| 5,785,067 A | | 7/1998 | Kosofsky |
| 5,803,982 A | | 9/1998 | Sosofsky et al. |
| 5,816,181 A | | 10/1998 | Sherman, Jr. |
| 5,932,112 A | | 8/1999 | Browning, Jr. |
| 6,000,418 A | | 12/1999 | Kern et al. |
| 6,053,121 A | | 4/2000 | Tamashima et al. |
| 6,106,731 A | * | 8/2000 | Hayes ......................... 210/760 |
| 6,125,778 A | * | 10/2000 | Rodden .................... 114/74 R |
| 6,165,371 A | | 12/2000 | Allen |
| 6,205,981 B1 | | 3/2001 | Lorraine |
| 6,231,769 B1 | * | 5/2001 | Pean et al. ................... 210/760 |
| 6,402,965 B1 | * | 6/2002 | Sullivan et al. ............. 210/748 |
| 6,432,304 B1 | * | 8/2002 | Nguyen ....................... 210/172 |
| 6,500,345 B2 | | 12/2002 | Constantine et al. |
| 6,516,738 B2 | * | 2/2003 | Cannon ....................... 114/125 |
| 6,613,232 B2 | * | 9/2003 | Chesner et al. ............. 210/650 |
| 2002/0088758 A1 | | 7/2002 | Blumenschein et al. |
| 2002/0162803 A1 | | 11/2002 | Haney |
| 2002/0191483 A1 | | 12/2002 | Ohtsuki et al. |
| 2003/0015481 A1 | * | 1/2003 | Eidem ......................... 210/760 |
| 2004/0055966 A1 | * | 3/2004 | Nguyen et al. ............. 210/748 |
| 2004/0060876 A1 | * | 4/2004 | Tipton ......................... 210/748 |

FOREIGN PATENT DOCUMENTS

WO        WO 00/20338        *   4/2000

* cited by examiner

*Primary Examiner*—Frank M. Lawrence
(74) *Attorney, Agent, or Firm*—Philip D. Freedman

(57) ABSTRACT

A method to treat ballast water comprises injecting ozone into water loading into a sea faring vessel prior to charging the water into a ballast tank; and charging the ozone injected water into the ballast tank. A system for treating ballast water comprises a sea faring vessel including at least one ballast tank; an ozone generator that generates ozone, a ballast water conduit that uptakes water through a loading port of a sea faring vessel and conducts the water to load the ballast tank; and an ozone feed line that injects ozone from the generator into water in the conduit at an injection point located upstream to an intersection of the conduit with the ballast tank.

43 Claims, 9 Drawing Sheets

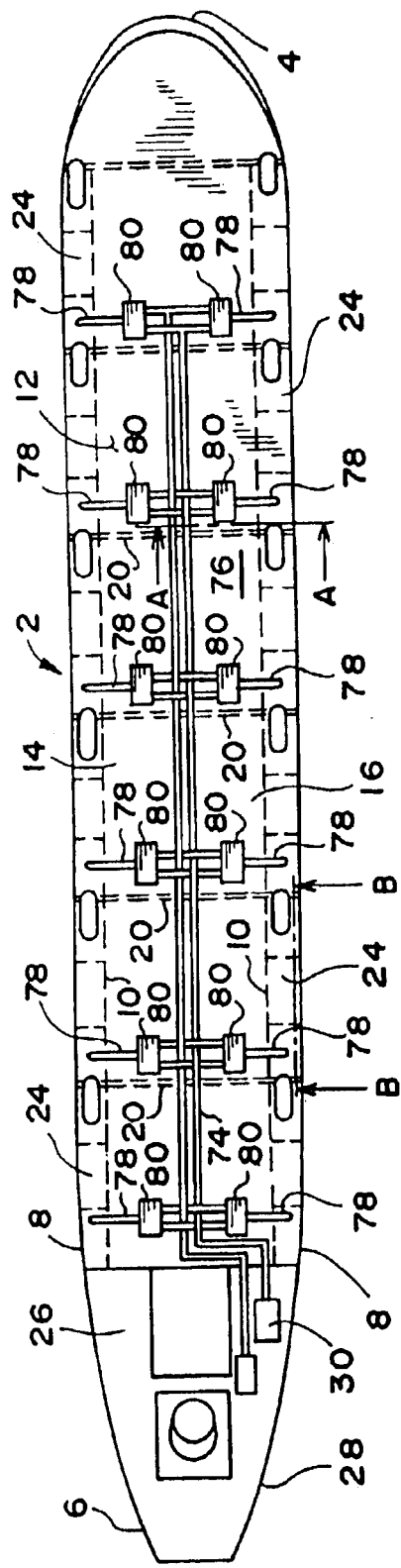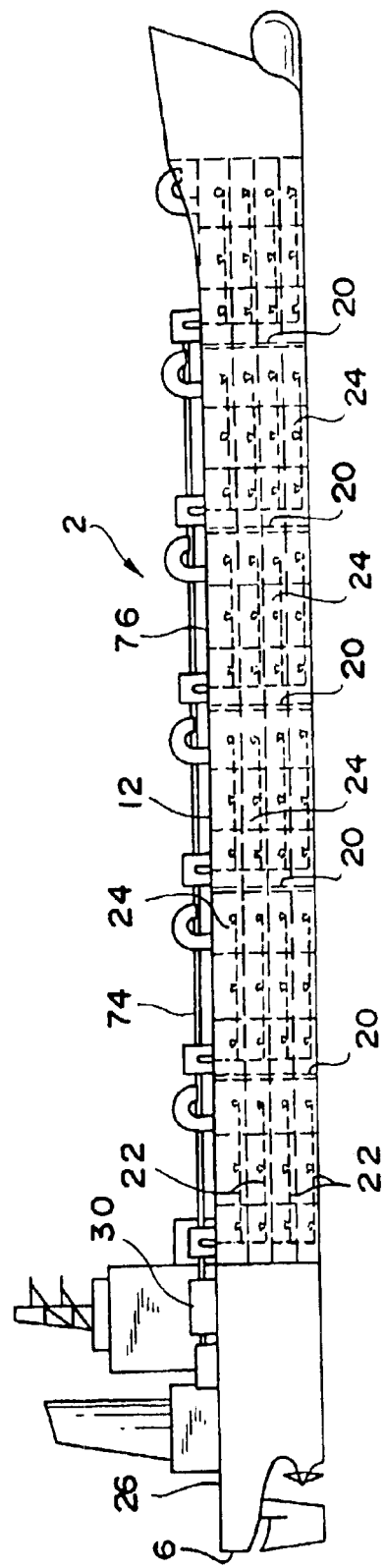
FIG. 2
PRIOR ART
FIG. 3
PRIOR ART

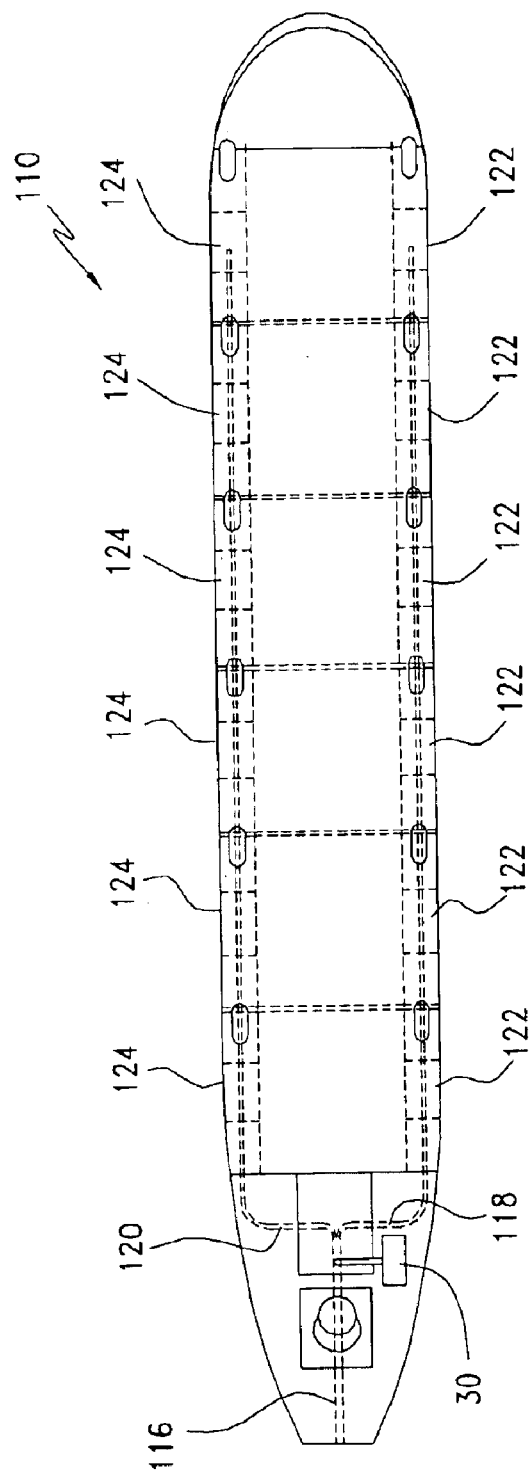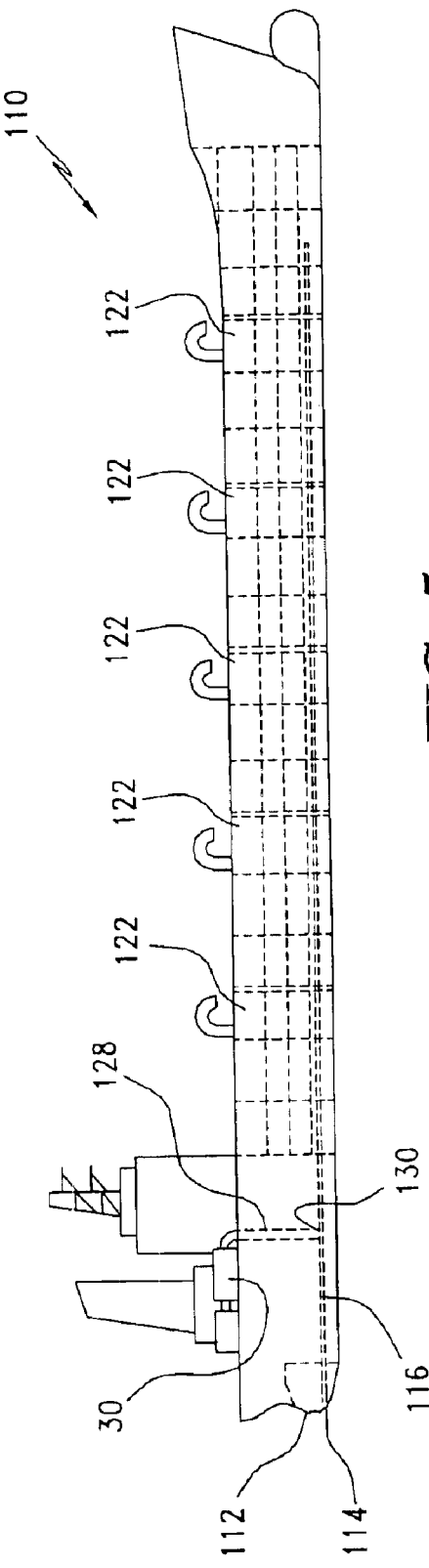

BALLAST WATER OZONE INJECTION METHOD AND SYSTEM

This application claims the benefit of U.S. Provisional Application Ser. No. 60/372,806, filed Apr. 17, 2002, the disclosure of which is incorporated herein by reference in its entirety.

BACKGROUND OF THE INVENTION

The invention relates to a ballast water ozone injection method and system. More particularly, the invention relates to a system for using ozone to treat ballast water during loading or discharge of ballast water to or from the ballast tanks of a sea faring vessel.

Ballast water weight is used by sea vessels to compensate for a lack of cargo weight when the cargo load is empty or partially empty. For example in a typical transport operation, a sea vessel docks at a first port where it is loaded with a cargo that the vessel transports to a second port where the cargo is unloaded. The vessel then returns to the first port where it is loaded with another cargo. Typically, the vessel travels empty from the second port back to the first port to pick up another cargo. The vessel is equipped with ballast tanks that can be filled with water to maintain the balance of the vessel on an even keel when it travels empty. Conventional ballast tanks include valves usually mounted over apertures through tank bulkheads. The valves are actuated to move water between and into and out of various ballast tanks to trim the vessel when empty of cargo or when carrying an unevenly distributed cargo.

The vessel fills its ballast tanks by taking on sea water, usually at its cargo discharge port. The sea water is charged into the ballast tanks at the same time that the vessel off loads its cargo. The vessel then travels to its cargo loading port where it takes on cargo while at the same time it empties at least some and typically all of its ballast tanks by discharging the ballast water into the loading port water environment.

The ballast water intake is below the water line of a vessel usually at or near the vessel hull bottom. The ballast water contains algae, zooplankton and other organisms that are indigenous to the cargo discharge port. Significant quantities of these indigenous organisms are loaded into the ballast tanks along with the water. The vessel then transports these organisms to the cargo loading port where the organisms are discharged into the water environment along with discharged ballast water. Some of these organisms may be deleterious to and very much unwanted in the loading port environment. They cause damage to the water environment and replace benthic organisms and clear plankton communities that provide food and larvae for resident native species in overlying waters.

The zebra mussel (*Dreissena polymorpha*) is an example of an unwanted organism that has been spread by ballast water. The zebra mussel was first found in the mid eighteenth century in the northern Caspian Sea and in the Ural River. Since then, the mussel has spread to other parts of the world by means of ballast water discharge. The mussel was found in the Great Lakes in late 1988. It was first prevalent in Lake Erie. Since then, the mussel has spread into Lake Michigan and into rivers of the Midwest and Northeast.

The mussel has threadlike tentacles that enable it to adhere to any vertical or horizontal surface. It is particularly adherent to the shell of another mussel. It reproduces quickly and in a brief time can obtain population densities in excess of 30,000 mussels per square meter. Stacks of adhering mussels have been known to completely clog water intake orifices and shut down municipal water treatment plants and industrial water systems.

In 1996, Congress passed the National Invasive Species Act (P. L. 104-332) to stem the spread of nonindigenous organisms by ballast water discharge. The act reauthorized the Great Lakes ballast management program and expanded applicability to vessels with ballast tanks. The Act requires the Secretary of Transportation to develop national guidelines to prevent the spread of organisms and their introduction into U.S. waters via ballast water of commercial vessels.

Guidelines developed pursuant to the can require vessels that enter U.S. waters to undertake ballast exchange in the high seas. Ballast water exchange involves replacing coastal water with open-ocean water during a voyage. This process reduces the density of coastal organisms by replacing them with oceanic organisms with a lower probability of survival in near shore waters. However, ballast exchange has two important short-comings. First, the ability to safely conduct ballast water exchange depends upon weather and sea surface conditions, and it is not always possible to perform an exchange. Second, there is still some residual density of coastal organisms in ballast tanks following exchange, so the process is only partly effective.

There is a need for a safe and effective method and system to treat ballast water for discharge into destination water environments.

BRIEF DESCRIPTION OF THE INVENTION

The invention relates to a safe and effective method and system to treat ballast water. The method comprises injecting ozone into water loading into a sea faring vessel prior to charging the water into a ballast tank; and charging the ozone injected water into the ballast tank. The system comprises a sea faring vessel including at least one ballast tank; an ozone generator that generates ozone, a ballast water conduit that uptakes water through a loading port of the sea faring vessel and conducts the water to load the ballast tank; and an ozone feed line that injects ozone from the generator into water in the conduit at an injection point located upstream to an intersection of the conduit with the ballast tank.

In an embodiment, the method of treating ballast water comprises pumping ballast water into a sea faring vessel through a flow line; and injecting ozone into the ballast water as it flows through the flow line.

Another method of ozone treatment comprises injecting ozone into water discharging from a ballast tank at a location downstream from the tank; and unloading the ozone injected water to the sea.

In another embodiment, a ballast-water treatment system comprises a sea faring vessel including at least one ballast tank; an ozone generator that generates ozone, a ballast water conduit that discharges water from the ballast tank and conducts the water to an unloading port of the sea faring vessel; and an ozone feed line that injects ozone from the generator into water in the conduit at an injection point located downstream to an intersection of the conduit with the ballast tank.

BRIEF DESCRIPTION OF THE DRAWING

FIG. 2 is a schematic top view of a prior art tanker and treatment system;

FIG. 3 is a schematic side view of a prior art tanker and treatment system;

FIG. 4 is a schematic top view of a tanker and treatment system illustrating an embodiment of the invention;

FIG. 5 is a schematic side view of the tanker of FIG. 4;

DETAILED DESCRIPTION OF THE INVENTION

Ozone ($O_3$) is an allotropic form of oxygen. It is an unstable blue gas with a pungent odor, a molecular weight of 48 g/mol and a density as a gas of 2.154 g/liter at 0° and 1 atm. It is approximately 13 times more soluble in water than is oxygen. Ozone is highly unstable and is a powerful oxidizing agent. It is 1.5 times better and approximately 3125 times faster than chlorine as an oxidizer. It is nonpersistent and has a very short half-life. Its half-life in pure distilled water is approximately 40 min at pH 7.6. Because of the unstable nature of the $O_3$ molecule, it cannot be stored but must be generated on-site.

Typically, ozone is produced by passing oxygen, in some concentration, through a highly charged corona field, a technique known as "corona discharge". The corona may be produced by applying a very high electric potential (20 kV) between two conductors that are separated by an insulating dielectric layer and a small air gap. Under these conditions, molecular oxygen ($O_2$) passing through the gap between the conductors experiences sufficient dissociation energy to partially ionize. A certain fraction of the free oxygen ions will re-associate in the form of $O_3$, according to the equilibrium reaction equation:

$$3O_2 + 69 \text{ kcal} \leftrightarrows 2O_3 \quad (I).$$

Ozone is currently used as a means for purifying liquids, but most applications for this technology have centered on relatively low liquid volume applications. Ozone has been increasingly suggested as a candidate for very large scale liquid purification projects. For example, ozone has been used to treat ballast water in ballast water tanks. The ozone rapidly converts naturally occurring ballast water iodides and bromides into bromine and iodine, which can be toxic to organisms. The general concept of ballast water treatment with ozone is to use a sea faring vessel's transit time between ports as an opportunity for treatment. In-transit ozone treatment of ballast water has been found to be cost-effective and environmentally sound. Ozone treatment is viewed as superior to both chemical treatment, which may require the transportation and disposal of hazardous substances over the sea, and separation technology, which is uneconomical because of the large volume of water requiring treatment.

Commonly assigned Rodden, U.S. Pat. No. 6,125,778 teaches a method to render ballast water free of contaminating organisms. In the Rodden method, a ballast water treatment system includes a source of ozone and a ballast tank connected to the source of ozone. The ozone is provided to a ballast tank through an ozone-transport system. The system may include a pressure generation system to regulate a flow pressure such that the flow pressure is substantially ambient at an exit end of the ozone generator while the ozone is injected under a positive pressure when reaching the ballast tank.

Figure 1:
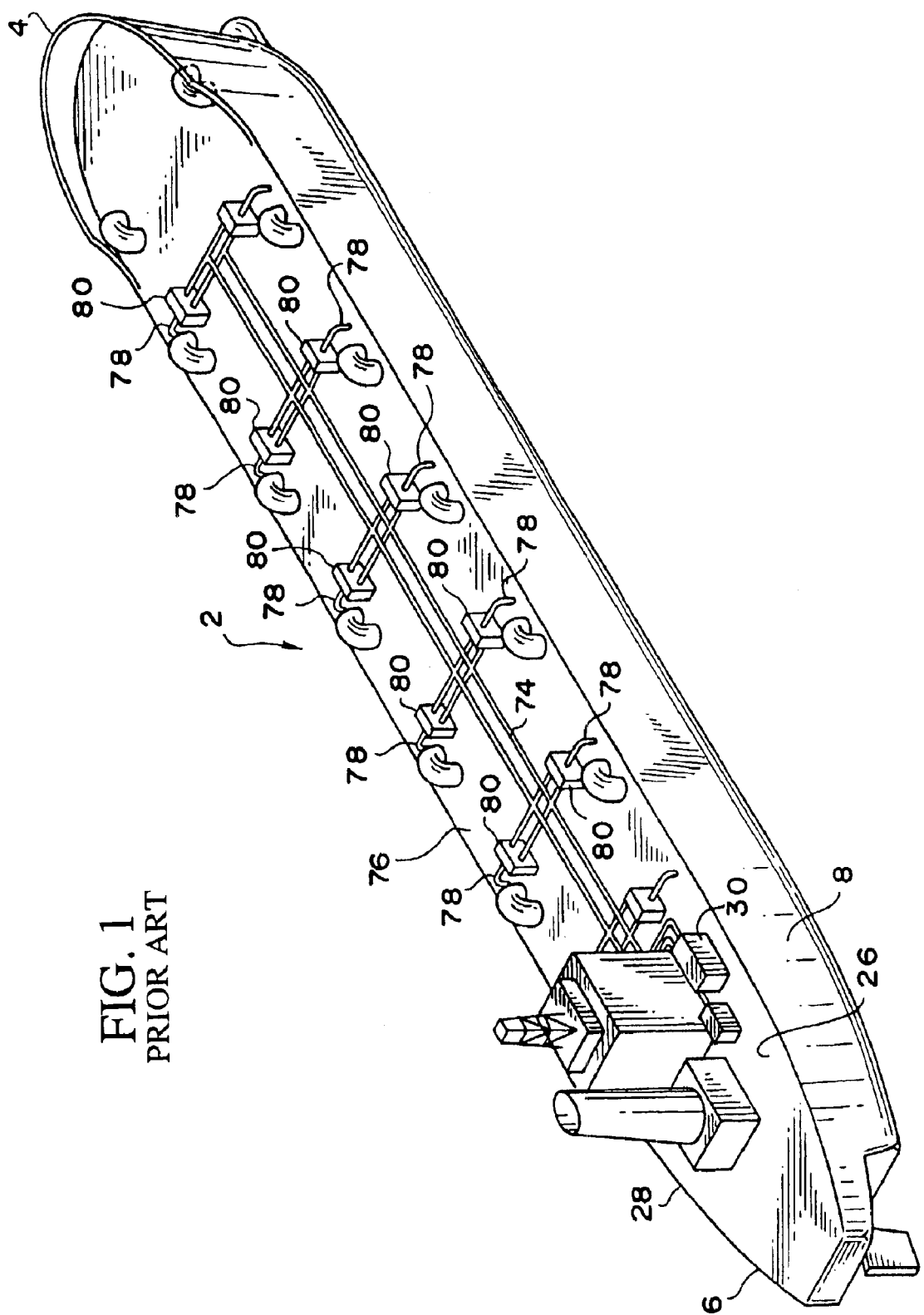
FIG. 1 is a schematic perspective view of a double hulled tanker and a prior art ballast water treatment system.

The Rodden system and method are illustrated in FIGS. 1 to 3, wherein tanker 2 includes bow 4, stern 6 and a double hull formed from outer hull 8 and inner hull 10. Tanker 2 can be a very large carrier designed for transporting crude oil. However, the present invention can be applied to any sea faring ship or vessel that has ballast tanks or bilge water. Tanker 2 is representative of the types of vessels encompassed within the invention and is a conventionally proportioned double hulled oil tanker having cargo compartments within inner hull 10. The tanker 2 is typical of vessels that transport partly or fully refined or residual petroleum or other bulk liquid products such as seed oil.

Tank section 12 of tanker 2 is formed by the interior surface of inner hull 10 and includes a port tank section 14 and a starboard tank section 16, which are separated by longitudinal bulkhead 18. The longitudinal bulkhead 18 extends the length of tank section 12. The port tank section 14 and starboard tank section 16 are divided along their lengths by transverse bulkheads 20. The transverse bulkheads 20 extend into the spacing between outer hull 8 and inner hull 10. The spacing is also divided by plating 22, which together with transverse bulkheads 20 divide the double hull spacing into a plurality of ballast tanks 24.

The ballast tanks 24 are filled or partially filled with water to maintain the balance of the tanker 2 on an even keel, particularly when it travels empty or partially filled. Tanker 2 typically fills its ballast tanks 24 by taking on water at its cargo discharge port. This water contains species indigenous to the discharge port. As described aforesaid, these species may be harmful to the environment at a cargo loading port where ballast water is discharged to balance added weight of loaded cargo. The tanker 2 may exchange the ballast water in open sea to avoid discharge at the loading port. However, this is a dangerous and labor intensive procedure. According to the present invention, ballast water is treated with ozone while the tanker 2 is in transit between ports to destroy the harmful species. Then, the treated ballast water can be discharged at a loading port without introducing foreign species into the loading port environment.

The Rodden patent describes an in transit ozone treatment of ballast water by means of a treatment system shown in FIGS. 1 to 3. The system includes a source of ozone that can be located anywhere on a vessel with ballast water in need of treatment. In FIGS. 1 to 3, an ozone generator 30 is located on bridge 26 of aft section 28. Ozone generator 30 can be any apparatus for the generation of ozone. The ozone generator 30 can include a tubular generator or a battery of tubular ozone generators.

Main ozone feed line 74 runs from ozone generator 30 along top deck 76 parallel to the longitudinal axis of tanker 10. Off lines 78 intersect feed line 74 at 90.degree.angles and connect to feed line 74 via valves 80. Each off line 74 runs from a respective valve 80 transverse to the feed line 74 and to the longitudinal axis of tanker 10, thence downwardly through top deck 76 into a ballast tank 24. As shown in FIGS. 2 3, tanker 2 includes a plurality of ballast tanks 24 arranged in both horizontal and vertical arrays between the tanker outer hull 8 and inner hull 10. Each vertical array extends transverse to the longitudinal axis of tanker 10 along the side of the tanker and along the tanker bottom as illustrated in FIG. 4. Each horizontal array extends parallel to the longitudinal axis of tanker 10 as shown in FIG. 5. FIG. 4 shows that each off line 78 extends down a vertical array and into an array of ballast tanks along the side of the tanker 2 and along the tanker bottom 82. A treatment line extends from each off line 78 into a horizontal array of tanks 24. The treatment line extends into a horizontal array of three tanks 24. However, a treatment line can extend into a horizontal array of any number of tanks. The tanks 24 are serially connected one after the other, to the ozone generator 30 by means of a treatment line and off line 78 via the feed line 74. Each off line 78 includes consecutively connected treatment lines from a first treatment line to a final treatment line connected near the termination of the off line 78 near the keel of the tanker 2. Tanks 24 are serially connected to each consecutively connected off line 78 in a manner as aforesaid.

A diffuser connects to a treatment line in each serially connected tank 24. The diffuser is a duct, chamber or section in which a high-velocity, low-pressure stream of ozone is converted into a high-velocity high-pressure flow in the form of small uniform bubbles. A preferred diffuser is a rigid, monolithic, porous gas diffusion element formed of a body of solid particles and comprised of a partially coated, permeable ceramic substrate. The diffuser injects ozone into water within a ballast tank 24 in the form of diffuse, substantially uniform bubbles that form a continuous cascading treatment pattern.

In operation, ozone is generated by ozone generator 30 and flows along the longitudinal axis of the tanker via main line 74. If valve 80 is actuated to connect an off line to main line 74, the ozone will be diffused into ballast water of the tank connected to the off line. The ozone diffusion is continued until the ballast water is substantially treated. During the treatment process, bromine and iodine is consumed in the destruction of the organisms. The bromine and iodine content of the water remains at a stable level until substantially all organisms have been destroyed. Then the bromine and iodine levels of the water begin to increase. Hence, effectiveness of ozone treatment of ballast water within a tank can be monitored by monitoring the ballast water bromine and/or iodine content. Periodic sampling of the water can be conducted. When the bromine and/or iodine content commences to increase to residual levels of about 1 ppm to about 2 ppm or greater then biokill of organisms is assured and ozone treatment can be can be terminated.

There are a number of complexities that arise in adapting an ozone treatment process to the very large water volumes used in ballast tanks. Further complexities arise from requirements of uniform and substantial dispersal of the ozone into ballast water to achieve adequate biokill. While the FIGS. 1 to 3 system and method are generally effective, they require close, delicate control of both flow rate and time of ozone treatment to provide sufficient biokill. Additionally, the piping, valving and diffuser equipment required to service all the ballast tank water is substantial. The equipment is expensive and subject to failure.

Another problem with the equipment intensive method and system of FIGS. 1 to 3 is engendered by the chemistry of the ozone generation reaction. Equation (I) is an equilibrium reaction. The reaction is endothermic to produce $O_3$, requiring energy, and is exothermic to produce $O_2$, giving up energy. Because of its equilibrium nature, the actual efficiency of this ozone formation is relatively low, in the range of 2–8%, depending on the oxygen content of the feed gas and the temperature of the reaction. After being processed in this way, the oxygen-containing feed gas acquires a dilute mixture of ozone. This dilute mixture is then diffused through the treatment liquid. However, the high-energy state of ozone results in very low stability of the gas. The natural tendency is for the ozone to revert back to the more stable, lower-energy allotrope $O_2$. While the solubility of ozone in water is approximately 13 times as great as the solubility of $O_2$, it has a very short half-life, about 40 minutes in distilled water at a pH of 7.6. Consequently, the storage of ozone is impractical and ozone generation must be performed substantially at the location of use.

In accordance with the invention, ballast water that is loaded through a port of a sea faring vessel is injected with ozone prior to charging to a ballast tank. The invention can utilize a single point or a small number of ozone injection points prior to charge of the water to the ballast tank to eliminate many of the disadvantages of the prior art ballast tank diffuser method. In another embodiment, ballast water that is discharged from a ballast tank is treated by injection of ozone into the unloading ballast water line prior to unloading to the sea. Surprisingly, despite the short half-life of ozone and the difficulty of charging a flow of water, injection of ozone to loading or discharging ballast water provides a residence time and diffusion for satisfactorily biokill. In an embodiment of the invention, a rate of injection of the ozone into the water is adjusted and the rate of water loading into (or un-loading from) the vessel is adjusted to provide a target biokill of species within the water. In this process, a target biokill is determined, for example by consulting ballast water discharge regulations, and the rate of ozone injection into the water and/or the rate of water flow in the water line is adjusted to obtain the target biokill. For example, the rate of injection can be adjusted and/or the rate of water loading can be adjusted to provide a concentration of ozone of 1.0 to 4.5 mg/l, desirably 1.5 to 4.0 mg/l and preferably 2.0 to 3.0 mg/l. This concentration can be effective to obtain in excess of 95% biokill of all species proscribed by the National Invasive Species Act.

Features of the invention will become apparent from the drawings and following detailed discussion, which by way of example without limitation describe preferred embodiments of the invention.

FIGS. 4 and 5 schematically represent a vessel 110 equipped with a loading water ozone injection system of the invention. Shown in the figures are the vessel "sea chest" stern section 112 with intake/discharge portal 114. Water conduit 116 connects the intake/discharge port 114 with parallel longitudinal main header pipes 118, 120 that traverse the vessel 110 from stern to a bow ballast tank connecting the intake/discharge port 114 with each of respective starboard and port batteries of ballast tanks 122, 124. Ballast water is loaded into the vessel 110 and is then pumped to load each ballast tank through the system of conduit and header pipes 116, 118 and 120 shown. At a destination, the process is reversed and water is pumped from each tank 122, 124 through the conduit and header pipes 116, 118 and 120 for discharge through intake/discharge port 114 to the sea. Or, discharge can be effected through another, separate conduit and port system from the up-take and charge system.

Ozone generator 30 is illustrated located on the aft deck 126 of the vessel 110. The generator 30 can generate ozone as described by Rodden U.S. Pat. Nos. 6,125,778; 6,139,809; and 6,270,733. The disclosures of these patents are incorporated herein by reference in their entirety. The generated ozone is pumped through line 128 for injection into water in conduit 116 in accordance with this embodiment of the invention. After injection with ozone, the water is conveyed by one of the main header pipes 118 and 120 that run the entire length of the vessel 110. As a header pipe 118 or 120 passes through each ballast tank 122 or 124, a smaller footer pipe (not shown) can be taken off to provide a suction/discharge line. Valving for the footer pipe can be contained in a tunnel or cofferdam area, or actually placed in the tank itself, if space is an issue.

Figure 6:
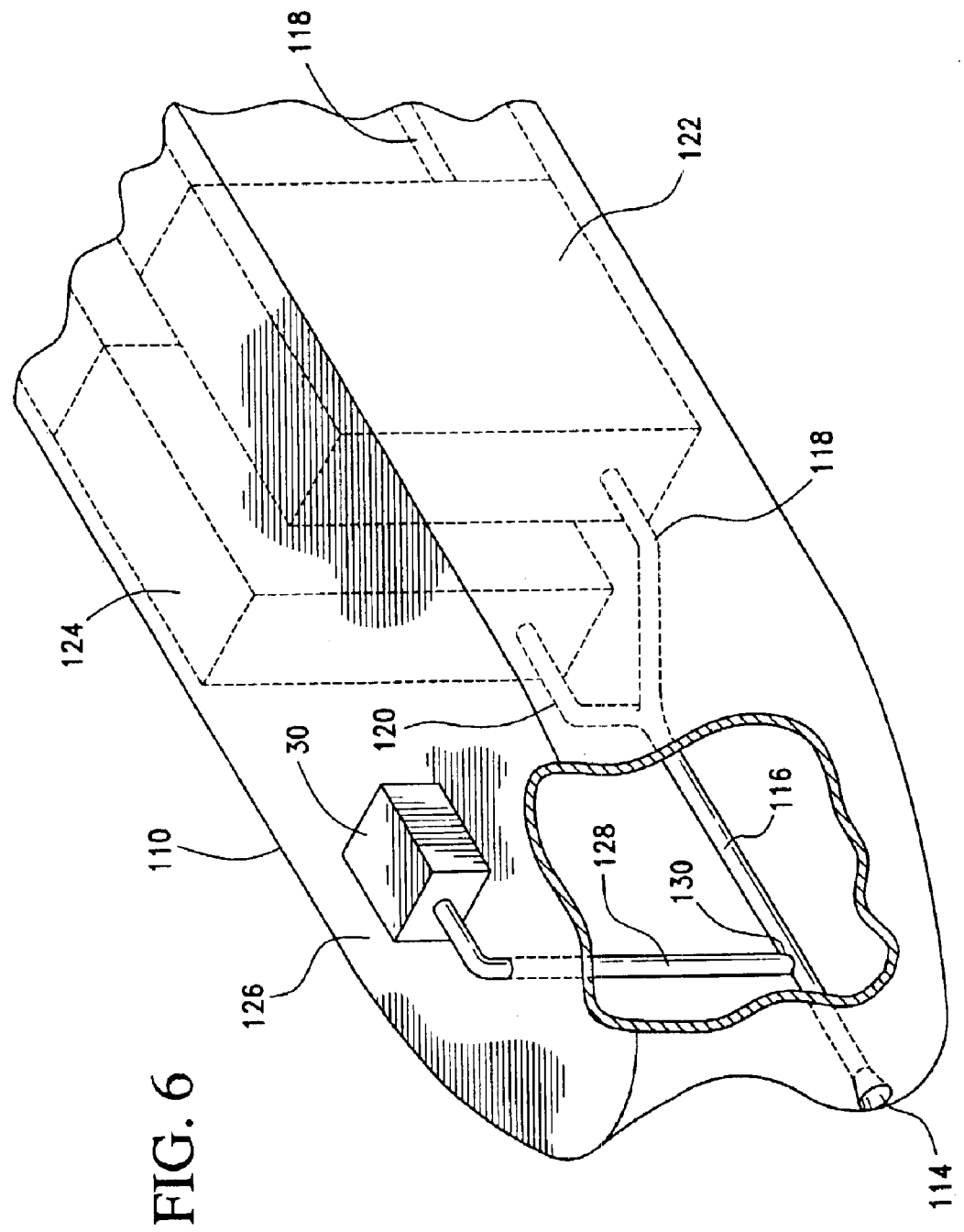
FIGS. 6 to 10 are schematic representations of embodiments of ballast water ozone injection methods and systems.

FIGS. 6 to 9 illustrate embodiments of a system and method to inject ozone into water prior to loading the water into a ballast tank. In each of FIGs. 6 to 9, like structures are identified with the same number. Each of the figures shows ozone generator 30 located on top deck 126 of a vessel 110 and each figure shows line 128 connecting the ozone generator 30 to a conduit 116 from intake/discharge port 114. In FIG. 6 ozone is injected into ballast water in conduit 116; then conduit 116 divides into conduits 118 and 120, each of which runs along the longitudinal axis of tanker 2. In FIG. 6, conduit 118 delivers ozone treated water to each ballast tank of a starboard battery of tanks 122 and conduit 120 delivers ozone treated water to each ballast tank of a port battery of tanks 124. Water enters through intake/discharge port 114 and is treated and charged into a tank of either the starboard battery or the port battery until each respective tank is sufficiently filled and balanced to compensate for off-loaded cargo.

Figure 7:
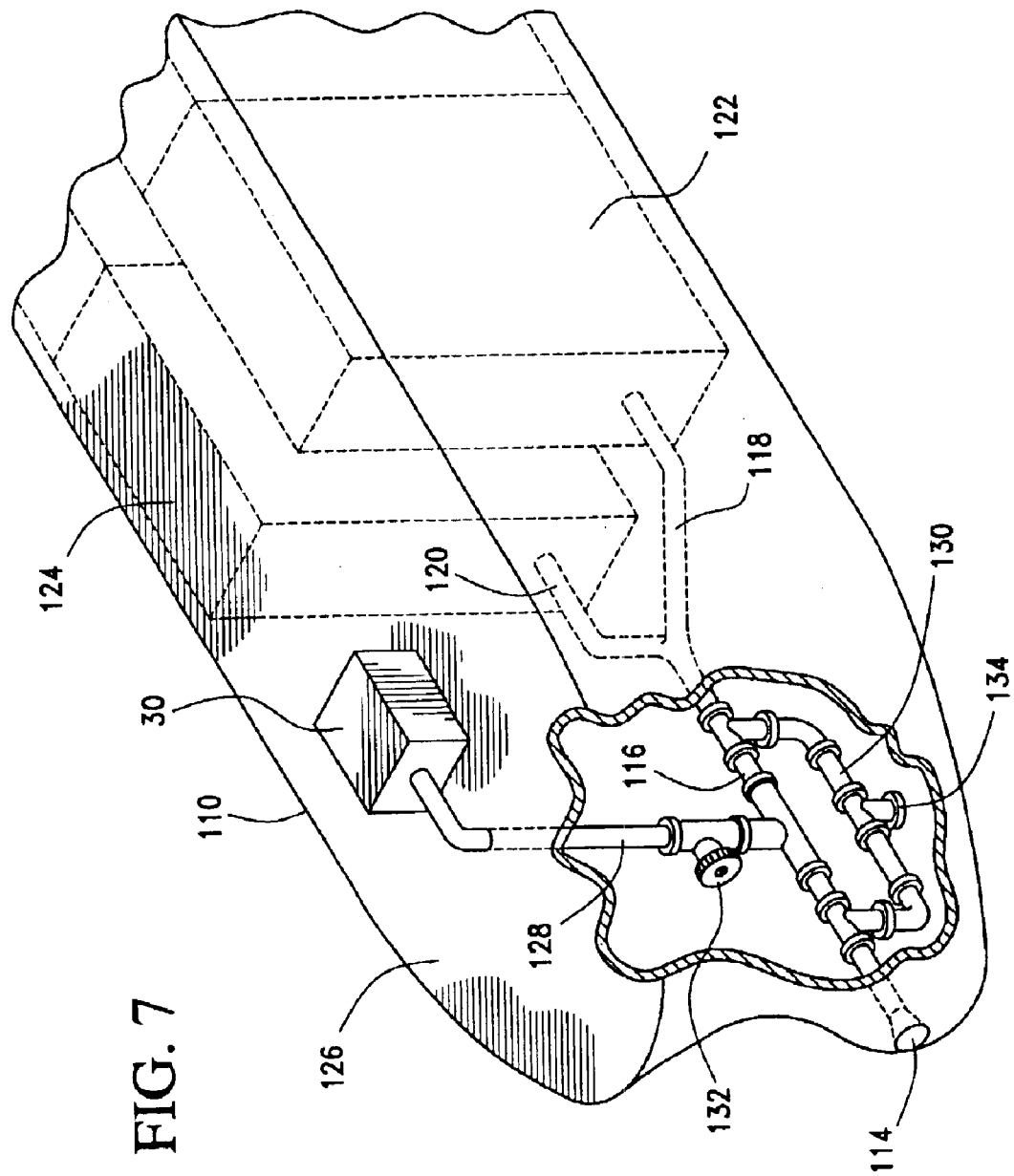

FIG. 7 shows line 128 to inject ozone into ballast water in conduit 116. In this embodiment, conduit 116 has a recycle conduit 130 that cycles a portion of the injected water from a position down stream from the point of ozone injection to a point upstream. The recycle provides enhance ozone injection to the ballast water. Valve 132 can control ozone injection into conduit 116 and valve 134 can control the proportion of recycle. The valves can be synchronized and tuned to control the degree of ozone treatment in the conduit 116 water. Downstream from the recycle, as in FIG. 6, the conduit 116 divides into conduits 118 and 120, each of which runs along the longitudinal axis of tanker 2. As in FIG. 6, conduit 118 delivers ozone treated water to each ballast tank of a starboard battery of tanks 122 and conduit 120 delivers ozone treated water to each ballast tank of a port battery of tanks 124.

Figure 8:
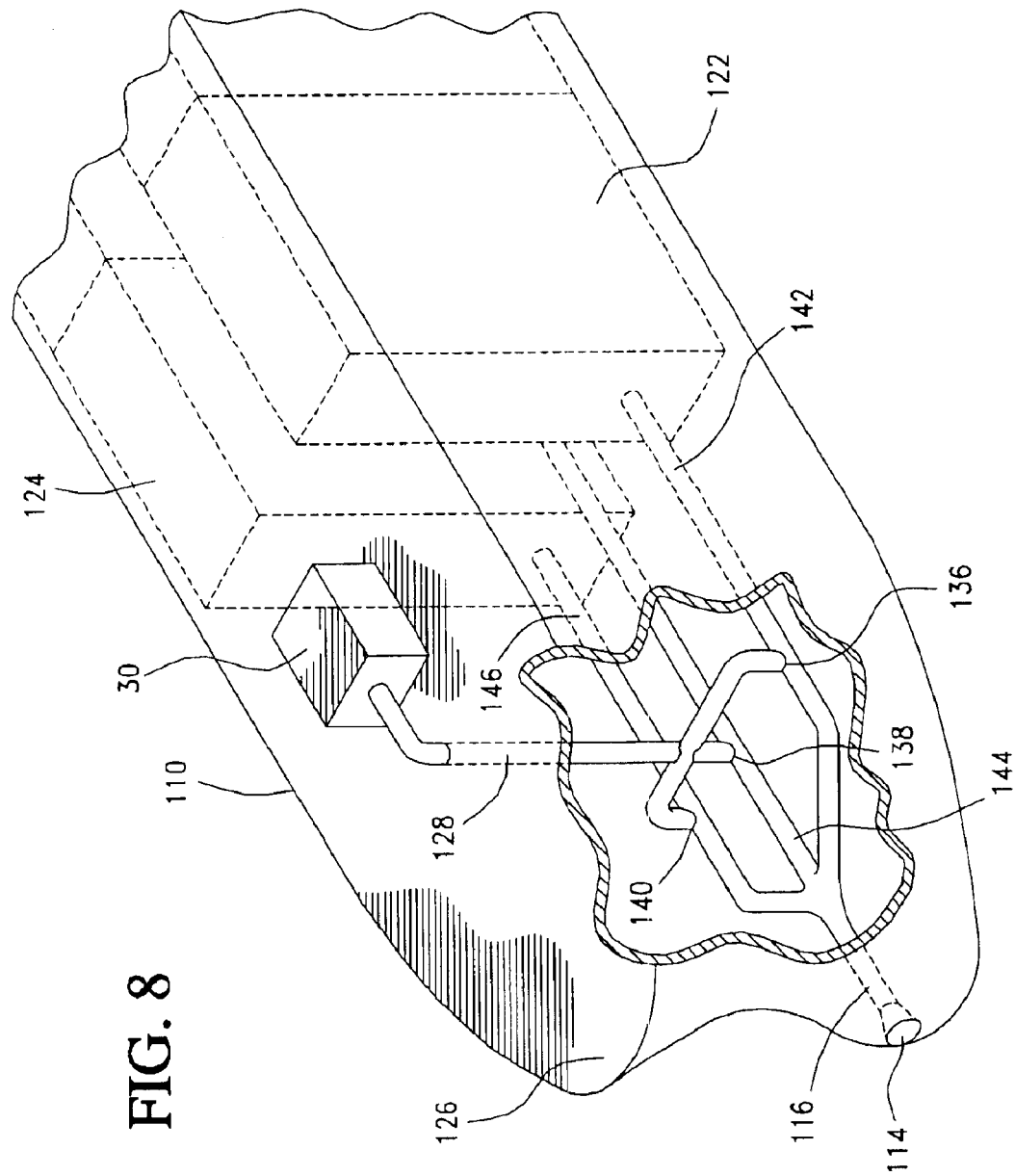

FIG. 8 shows a system wherein ozone is injected into single points 136, 138, 140 in a plurality of conduits 142, 144 and 146, which can deliver ozone treated ballast water to a number of separately connected or serially connected ballast tanks. While FIG. 8 shows three conduits 142, 144 and 146, this depiction is intended to represent any number of a plurality of injection points prior to delivery of ozone to ballast tanks, or indeed, to represent any number of a plurality of injection points in conduits discharging ballast water from tanks.

Figure 9:
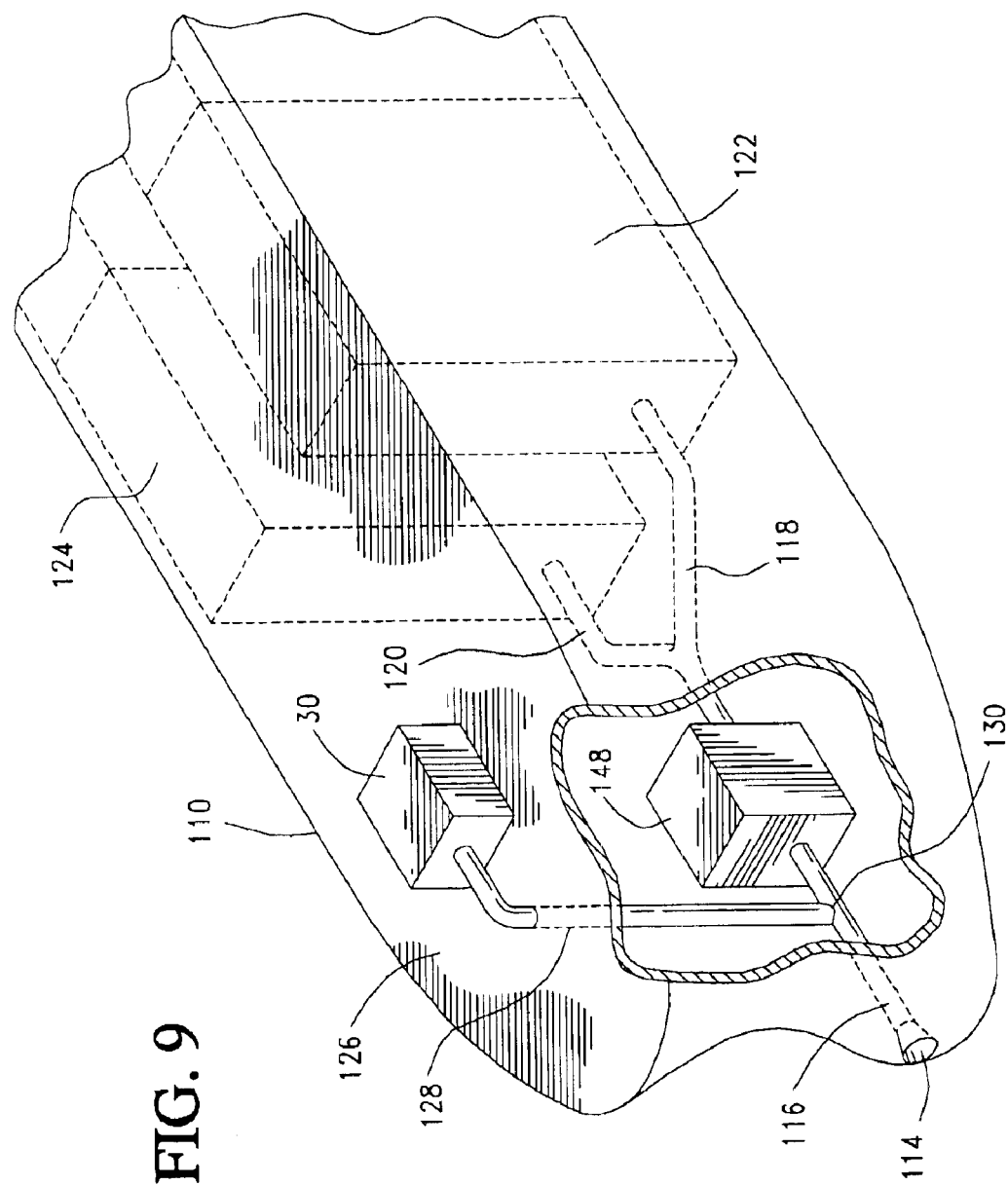
Figure 10:
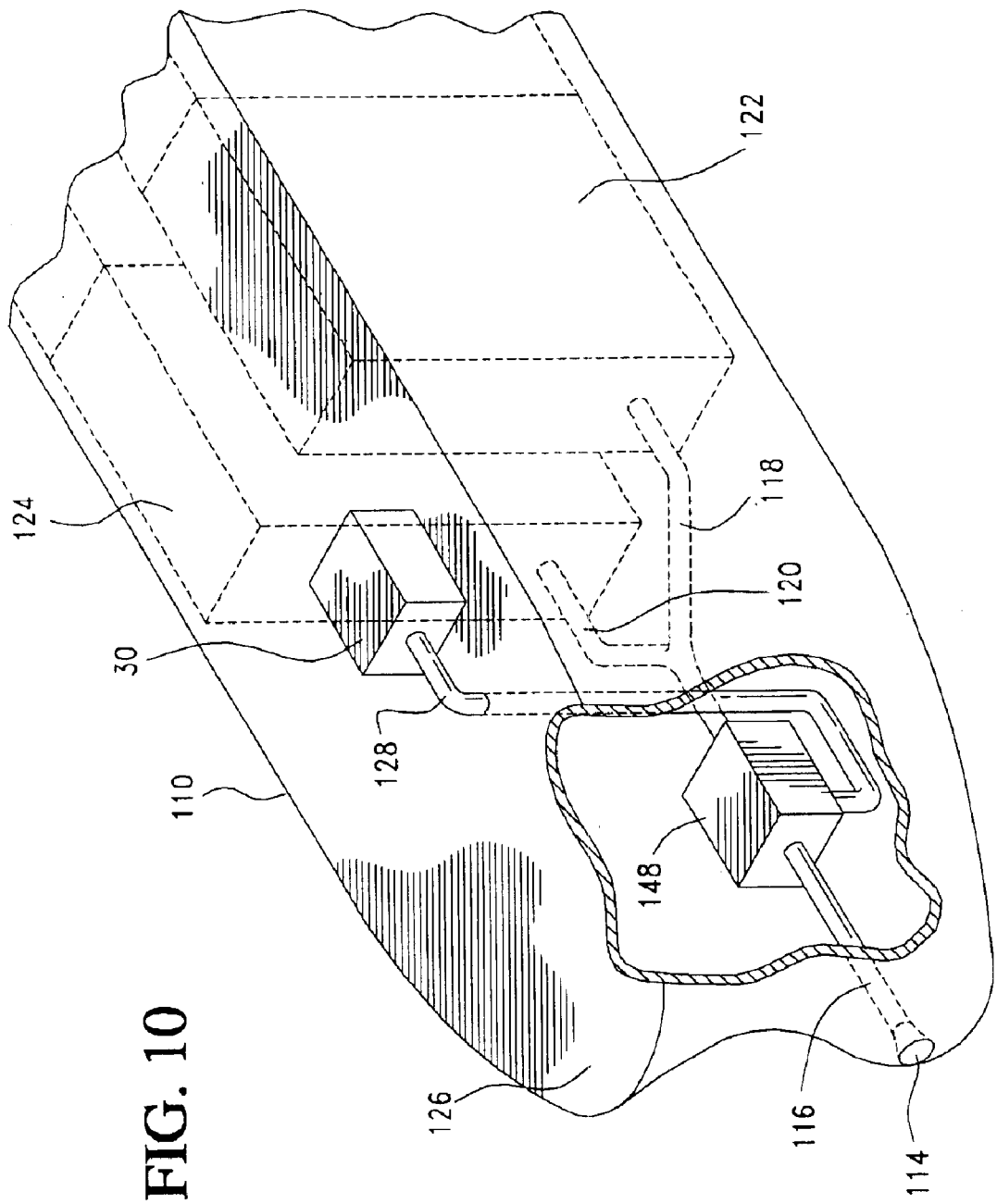

FIG. 9 illustrates the concept of a loading tank 148. In this embodiment, ozone is injected into ballast water in conduit 116; then conduit 116 divides into conduits 118 and 120, each of which runs along the longitudinal axis of tanker 2. However, in this embodiment, conduit 115 first fills loading tank 148. Only after filling loading tank 148 is water allowed to flow into conduits 118 and 120. After filling loading tank 148, the flow is continuous into conduits 118 and 120 and is adjusted according to flow into the tank 148 to provide a steady state delivery to the tank and flow from the tank 148. Residency time in tank 148 enlarges the opportunity to load ballast water with ozone for improved treatment and biokill. The embodiment in FIG. 9 shows a separate loading tank 148. However, in actuality a first ballast tank can be used as a loading tank with overflow water from the first tank being conveyed to the other ballast tanks for filling one by one. FIG. 9 shows a like loading tank embodiment wherein ozone is charged directly into the tank 148 rather than into conduit 116 at a location upstream from the loading tank 148.

The invention advantageously minimizes system hardware particularly piping and control cabling. The invention replaces valves and controls from ballast tank water to extend system life and simplify maintenance and repair compared to an intank ballast water treatment system.

The following EXAMPLE is illustrative and should not be construed as a limitation on the scope of the claims unless a limitation is specifically recited.

EXAMPLE

Figure 11:
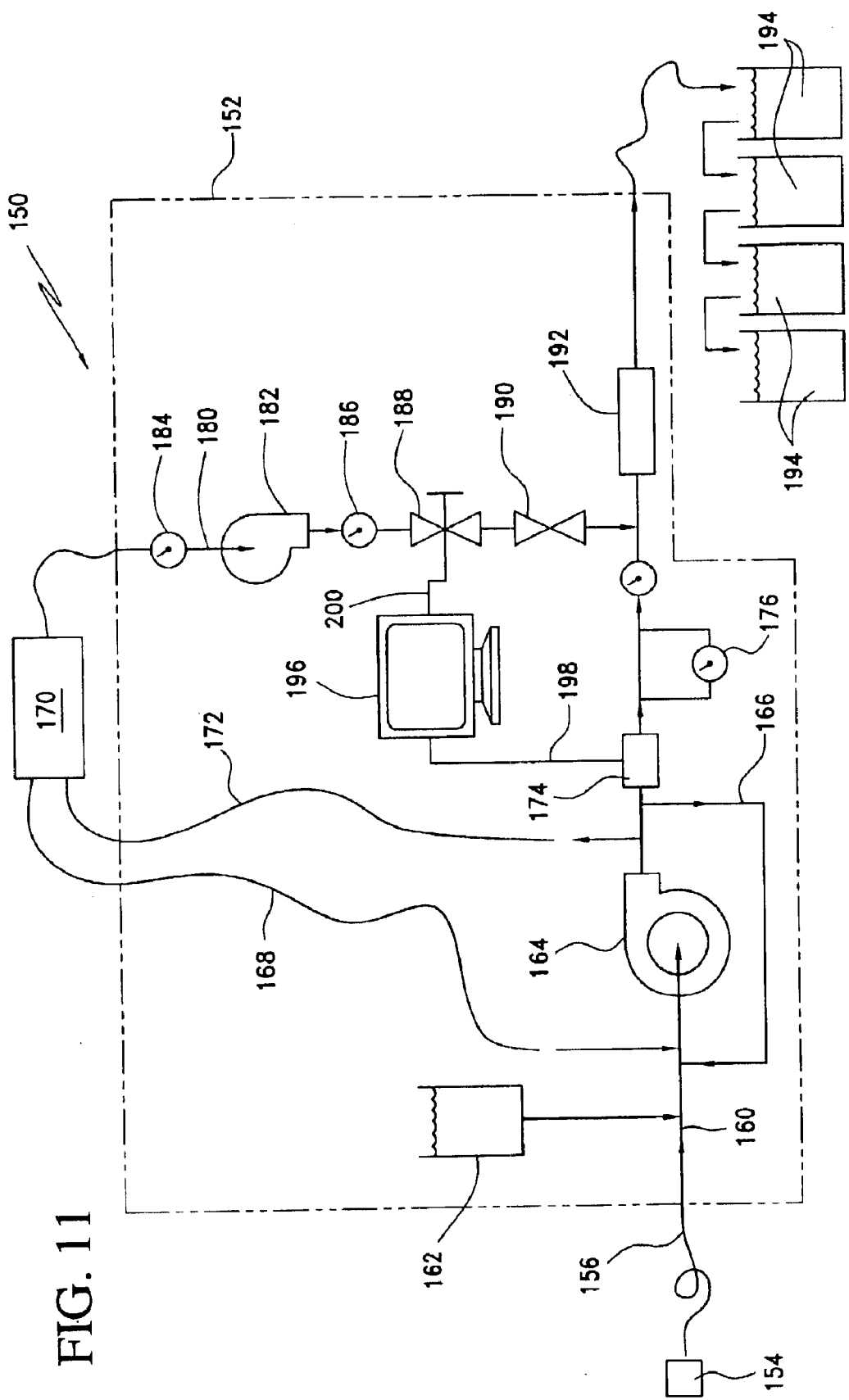
FIG. 11 is a schematic representation of a system to conduct a test ballast water ozone injection.

FIG. 11 schematically illustrates a single point injection test system 150. The system 150 can be used to determine effectiveness of a single point ozone injection treatment. The FIG. 11 shows an ozone differential test module 152 with a sea water source 154 feeding through a 10 inch flexible hose 156 to a 1½ inch main feed line 160. The module 152 comprises a five gallon spike source 162, centrifugal pump 164 with 40.0 CPM at 35 PSI capacity and a ¾ inch return line 166. A ¾ inch flow line 168 comprising 1 to 1000 psi pressure gauge tubing connects an ozone generator 170 to the sea water main line 160 to divert incoming water for cooling purposes. A same gauge flow line 172 returns the sea water to main line 160. Flow control valve 174 is located on main feed line 160 downstream from centrifugal pump 164. Flow meter 176 measures line flow at a location immediately down stream from the control valve 174.

A ¼ inch Teflon tubing feed line 180 conveys ozone from generator 170 to a single point injection to main line 160. The single point 182 represents a location subsequent to sea water inflow into a vessel prior to charge into a vessel's ballast tanks. However, it should be understood that the experimental system 150 can represent a single point injection into ballast water as the water is expelled from ballast tanks to the sea as well. In the test system 150, the feed line 180 includes centrifugal pump 182 with upstream gauge 184 and downstream gauge 186, flow valve 188 and check valve 190. Ozone generation and injection into incoming or discharging sea water in line 180 is controlled with the series of valves 188, 190 and coordinated with flow control valve 174 and pump 164 to provide a target concentration of ozone (and correspondingly a target biokill) within the water in line 160. The injected water flows through inline static meter 192 and is then discharged into a battery of 75 gallon test tanks 194 each with a sampling port. Controller 196 controls water flow in line 196 via flow control valve 174 and ozone injection flow valve 188 and receives feed back on rate of injection and biokill from static meter 192 and sampling from the test tanks 194. In operation, controller 196 controls 198 line 160 water flow in coordination with control 200 of ozone injection to effectively achieve biokill prior to water loading into ballast tanks represented by the tanks 194 or to effectively achieve biokill to discharging ballast water from ballast tanks to the sea. The system is operated until a target 95% biokill is obtained of species that are proscribed by the National Invasive Species Act. A concentration of 2.5 mg/l of ozone in the water is determined to provide target biokill.

While preferred embodiments of the invention have been described, the present invention is capable of variation and modification and therefore should not be limited to the precise details of the Examples. The invention includes changes and alterations that fall within the purview of the following claims.

What is claimed is:

1. A method of ozone treatment, comprising:
   injecting ozone into water loading into a sea faring vessel prior to charging the water into a ballast tank;
   charging the ozone injected water into the ballast tank; and
   adjusting a rate of injection of the ozone into the water and adjusting the rate of water loading into the vessel to provide a target biokill of species within the water.

2. The method of claim 1, comprising injecting ozone into water loading into the vessel at a single point prior to charging the water into the ballast tank.

3. The method of claim 1, comprising injecting the ozone into the water at or near a point of loading the water into the sea faring vessel.

4. The method of claim 1, comprising injecting the ozone into the water at a point intermediate between a ballast water port of the vessel and the ballast tank.

5. The method of claim 1, comprising in-line injecting the ozone into the water in a conduit at a location prior to charging of the water into the ballast water tank of a sea faring vessel.

6. The method of claim 1, comprising pumping water into the sea faring vessel, injecting the ozone into the water and then charging the ozone injected water into the ballast tank.

7. The method of claim 1, comprising injecting ozone into the water, then dividing the water into at least two streams for charging into ballast tanks of respective at least two batteries of ballast tanks.

8. The method of claim 1, comprising injecting ozone into the water at an injection point and recycling at least a portion of the injected water to a location upstream of the injecting point so that the recycle portion is further injected with ozone at the injecting point.

9. The method of claim 1, comprising injecting ozone into a plurality of water streams prior to charging each stream into a respective ballast tank of a plurality of ballast tanks.

10. The method of claim 1, comprising adjusting a rate of injection of the ozone into the water to provide a target biokill of species within the water.

11. The method of claim 1, comprising adjusting a rate of injection of the ozone into the water to provide a concentration of ozone of 1.0 to 4.5 mg/l in the water.

12. The method of claim 1, comprising adjusting a rate of injection of the ozone into the water to provide a concentration of ozone of 1.5 to 4.0 mg/l in the water.

13. The method of claim 1, comprising adjusting a rate of injection of the ozone into the water to provide a concentration of ozone of 2.0 to 3.0 mg/l in the water.

14. The method of claim 1, comprising adjusting a rate of injection of the ozone into the water and adjusting the rate of water loading into the vessel to provide a concentration of ozone of 1.0 to 4.5 mg/l in the water.

15. The method of claim 1, comprising adjusting a rate of injection of the ozone into the water and adjusting the rate of water loading into the vessel to provide a 95% or greater species biokill in the water.

16. The method of claim 1, comprising adjusting a rate of injection of the ozone into the water; adjusting the rate of water loading into the vessel and providing a residence time for the water prior to charging into the ballast tank to provide a target biokill of species within the water charging into the ballast tank.

17. The method of claim 1, comprising:
injecting ozone into the water;
loading the ozone injected water into a tank;
permitting the ozone injected water to reside in said tank; and then
charging ozone injected water from the tank to another tank.

18. The method of claim 17, comprising adjusting a rate of injection of the ozone into the water; adjusting the rate of water loading into the vessel and providing a residence time for the water prior to charging into another tank to provide a target biokill of species within the water charging into the another ballast tank.

19. A ballast-water treatment system comprising:
a sea faring vessel including at least one ballast tank;
an ozone generator that generates ozone,
a ballast water conduit that uptakes water through a loading port of a sea faring vessel and conducts the water to load the ballast tank;
an ozone feed line that injects ozone from the generator into water in the conduit at an injection point located upstream to an intersection of the conduit with the ballast tank;
a controller operatively connected to the conduit to regulate water flow within the conduit;
a controller operatively connected to the ozone generator to regulate injection of ozone into the water flowing within the conduit.
a computer usable medium comprising a set of instructions to operate the water flow controller to regulate water flow within the conduit and operatively connected to the ozone generator controller to regulate injection of ozone into the water flowing within the conduit.

20. The system of claim 19, comprising the computer usable medium comprising a set of instructions to operate the controllers to coordinate water flow and injection of ozone to provide a target level of biokill in the water.

21. The system of claim 19, comprising the computer usable medium comprising a set of instructions to operate the controllers to coordinate water flow and injection of ozone to provide a concentration of ozone of 1.0 to 4.5 mg/l in the water.

22. The system of claim 19, comprising the computer usable medium comprising a set of instructions to operate the controllers to coordinate water flow and injection of ozone to provide a concentration of ozone of 1.5 to 4.0 mg/l in the water.

23. The system of claim 19, comprising the computer usable medium comprising a set of instructions to operate the controllers to coordinate water flow and injection of ozone to provide a concentration of ozone of 2.0 to 3.0 mg/l in the water.

24. The system of claim 19, comprising the computer usable medium comprising a set of instructions to operate the controllers to coordinate water flow and injection of ozone to provide a 95% or greater species biokill in the water.

25. A method of ozone treatment, comprising:
injecting ozone into water discharging from a ballast tank at a location downstream from the tank; and
unloading the ozone injected water to the sea.

26. The method of claim 25, comprising injecting ozone into water discharging from a ballast tank at a single location downstream from the tank.

27. The method of claim 25, comprising injecting the ozone into the water at or near a point of discharge from the ballast tank.

28. The method of claim 25, comprising injecting the ozone into the water at a point intermediate between the ballast tank and a ballast water unloading port of the vessel.

29. The method of claim 25, comprising charging water into the ballast tank of a sea faring vessel; thereafter discharging water from the ballast tank; injecting the ozone into the discharging water and unloading the ozone injected water into the sea.

30. The method of claim 25, comprising adjusting a rate of injection of the ozone into the water and adjusting a rate of water discharging from the ballast tank to provide a target biokill of species within the water prior to unloading to the sea.

31. The method of claim 25, comprising adjusting a rate of injection of the ozone into the water to provide a concentration of ozone of 1.0 to 4.5 mg/l.

32. The method of claim 25, comprising adjusting a rate of injection of the ozone into the water to provide a concentration of ozone of 1.5 to 4.0 mg/l in the water.

33. The method of claim 25, comprising adjusting a rate of injection of the ozone into the water to provide a concentration of ozone of 2.0 to 3.0 in the water.

34. The method of claim 25, comprising adjusting a rate of water flow and injection of ozone to provide a concentration of ozone of 1.0 to 4.5 mg/l in the water.

35. A ballast-water treatment system comprising:
a sea faring vessel including at least one ballast tank;
an ozone generator that generates ozone,
a ballast water conduit that discharges water from the ballast tank and conducts the water to an unloading port of the sea faring vessel;
an ozone feed line that injects ozone from the generator into water in the conduit at an injection point located downstream to an intersection of the conduit with the ballast tank;
a controller operatively connected to the conduit to regulate water flow within the conduit;
a controller operatively connected to the ozone generator to regulate injection of ozone into the water flowing within the conduit.
a computer usable medium comprising a set of instructions to operate the water flow controller to regulate water flow within the conduit and operatively connected to the ozone generator controller to regulate injection of ozone into the water flowing within the conduit.

36. The system of claim 35, comprising the computer usable medium comprising a set of instructions to operate the controllers to coordinate water flow and injection of ozone to provide a target level of biokill in the water.

37. The system of claim 35, comprising the computer usable medium comprising a set of instructions to operate the controllers to coordinate water flow and injection of ozone to provide to provide a concentration of ozone of 1.0 to 4.5 mg/l in the water.

38. The system of claim 35, comprising the computer usable medium comprising a set of instructions to operate the controllers to coordinate water flow and injection of ozone to provide to provide a concentration of ozone of 1.5 to 4.0 mg/l in the water.

39. The system of claim 35, comprising the computer usable medium comprising a set of instructions to operate the controllers to coordinate water flow and injection of ozone to provide to provide a concentration of ozone of 2.0 to 3.0 mg/l in the water.

40. The system of claim 35, wherein ozone feed line injects ozone from the generator into water in the conduit at a single injection point located downstream to an intersection of the conduit with the ballast tank.

41. A method of ozone treatment, comprising:
injecting ozone into water loading into a sea faring vessel prior to charging the water into a ballast tank;
charging the ozone injected water into the ballast tank; and
adjusting a rate of injection of the ozone into the water and adjusting the rate of water loading into the vessel to provide a concentration of ozone of 1.0 to 4.5 mg/l in the water.

42. The method of claim 41, comprising adjusting the rate of injection of the ozone into the water and adjusting the rate of water loading into the vessel to provide a 95% or greater species biokill in the water.

43. The method of claim 41, comprising adjusting the rate of injection of the ozone into the water; adjusting the rate of water loading into the vessel and providing a residence time for the water prior to charging into the ballast tank to provide a target biokill of species within the water charging into the ballast tank.

* * * * *